(12) United States Patent
Schmidt et al.

(10) Patent No.: US 10,910,830 B2
(45) Date of Patent: Feb. 2, 2021

(54) ELECTRICAL PROTECTIVE CIRCUIT

(71) Applicant: Phoenix Contact GmbH & Co. KG, Blomberg (DE)

(72) Inventors: Olaf Schmidt, Soest-Mullingsen (DE); Jochen Zeuch, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 345 days.

(21) Appl. No.: 15/766,491

(22) PCT Filed: Sep. 23, 2016

(86) PCT No.: PCT/EP2016/072659
§ 371 (c)(1),
(2) Date: Jul. 26, 2018

(87) PCT Pub. No.: WO2017/060100
PCT Pub. Date: Apr. 13, 2017

(65) Prior Publication Data
US 2019/0067937 A1    Feb. 28, 2019

(30) Foreign Application Priority Data

Oct. 9, 2015   (DE) .................. 10 2015 117 232

(51) Int. Cl.
*H02H 9/04* (2006.01)
*H02H 1/06* (2006.01)
*H02H 1/00* (2006.01)

(52) U.S. Cl.
CPC .......... *H02H 9/041* (2013.01); *H02H 1/0007* (2013.01); *H02H 1/06* (2013.01)

(58) Field of Classification Search
CPC ............................ H02H 1/0007; H02H 3/023
See application file for complete search history.

(56) References Cited

U.S. PATENT DOCUMENTS

2011/0025278 A1*   2/2011  Balakrishnan .......... H02M 1/32
                                                              320/166
2013/0077201 A1*   3/2013  Sagona .................. H02H 7/067
                                                              361/91.1
(Continued)

FOREIGN PATENT DOCUMENTS

CN          104426343 A      3/1918
CN           1578090 A       2/2005
(Continued)

*Primary Examiner* — Alex Torres-Rivera
(74) *Attorney, Agent, or Firm* — Holland & Hart LLP

(57) ABSTRACT

The present disclosure relates to an electrical protective circuit, comprising: an input terminal to which a main input voltage can be applied; a switching path arranged in parallel with the input terminal, wherein a controllable switch is configured to close the switching path; a sensor device connected to the input terminal and configured to detect an incorrect main input voltage present at the input terminal, wherein the sensor device is further configured to transmit a control signal to the controllable switch to close the switching path when an incorrect main input voltage is detected; and an energy supply device connected in parallel with the switching path and configured to convert a voltage drop across the closed controllable switch into a supply voltage and to apply the supply voltage to the sensor device.

18 Claims, 4 Drawing Sheets

(56) References Cited

U.S. PATENT DOCUMENTS

| | | | |
|---|---|---|---|
| 2014/0055898 A1* | 2/2014 | Kostakis | H02H 3/025 361/91.5 |
| 2014/0254054 A1 | 9/2014 | Bulliard et al. | |
| 2014/0293493 A1* | 10/2014 | Heurtier | H02H 9/04 361/91.5 |
| 2014/0340799 A1* | 11/2014 | Gray | H02H 9/005 361/56 |
| 2015/0062768 A1 | 3/2015 | Prescott | |
| 2015/0229121 A1 | 8/2015 | Davidson | |

FOREIGN PATENT DOCUMENTS

| | | |
|---|---|---|
| CN | 103430436 A | 12/2013 |
| CN | 103828205 A | 5/2014 |
| CN | 104242631 A | 12/2014 |
| DE | 10 2012 015 322 A1 | 5/2014 |
| EP | 2 219 205 A1 | 8/2010 |

* cited by examiner

ELECTRICAL PROTECTIVE CIRCUIT

CROSS-REFERENCE TO RELATED APPLICATIONS

This application is a 371 national phase filing of International Application No. PCT/EP2016/072659, entitled "ELECTRICAL PROTECTIVE CIRCUIT", filed 23 Sep. 2016, which claims priority to German Patent Application No. 10 2015 117 232.1, entitled "ELEKTRISCHE SCHUTZSCHAL TUNG", filed 9 Oct. 2015.

BACKGROUND

The present disclosure relates to an electrical protective circuit.

To protect electrical circuits from overvoltage or from the reverse polarity of an applied main input voltage, overvoltage protectors or, conversely, reverse polarity protection devices can be used. A reverse polarity protection device often comprises a diode, which is arranged anti-parallel to the main input voltage and which, in the case of reverse polarity, limits the main input voltage to the forward voltage of the diode. In addition to the diode, such circuits typically use a fuse, which is triggered by a reverse polarity. An overvoltage protector typically comprises either a switch, which is connected in series to the main input voltage and which opens in case an overvoltage is applied, or a switch, which is connected in parallel to the main input voltage and which closes in case an overvoltage is applied. However, high losses may occur across the switches in overvoltage protectors during regular operation. Furthermore, such switches can often only be used for short periods of time.

Additionally, so-called crowbar or clamper circuits can be used as overvoltage protectors. A crowbar circuit comprises a short-circuit switch and an overvoltage sensor, which activates the short-circuit switch when it detects an overvoltage, thus short-circuiting the main input voltage.

The short-circuit switch of the crowbar circuit can be a thyristor or a field-effect transistor (FET). The thyristor can be latched to short-circuit the terminals when an overvoltage is applied and stay latched by itself until the current through the thyristor falls below a holding current. But high losses usually occur across the thyristor. To limit these losses, a fuse usually is added to the electrical circuit, which is triggered as a consequence of the latching of the thyristor. However, this fuse causes great limitations in the current or voltage supply device connected to the crowbar circuit. For example, to guarantee a quick triggering of the fuse, any connected power source must be able to supply three times as much current as the nominal value of the fuse.

On the other hand, if the short-circuit switch is a FET, an external energy source typically is required to control the short-circuit switch, which may result in additional costs. Furthermore, any failure of the external energy source means that the protective function of the crowbar circuit is no longer ensured. If the control voltage of the PET is provided by an input voltage of the crowbar circuit rather than from an external energy source, the protective function also may no longer be ensured in the case of reverse polarity of the input voltage.

SUMMARY

The object underlying the present disclosure is to provide an energy-efficient electrical protective circuit.

This object is achieved by the subject matters with the characteristics according to the independent claims. Advantageous examples of the disclosure are the subject matter of the drawings, the description and the dependent claims.

According to a first aspect of the disclosure, the object is achieved by an electrical protective circuit, comprising: an input terminal, to which a main input voltage can be applied; a switching path, which is arranged in parallel to the input terminal, wherein a controllable switch for closing the switching path is connected in the switching path; a sensor device, which is connected to the input terminal and is designed to detect an incorrect main input voltage present at the input terminal, wherein the sensor device is designed to transmit a control signal to the controllable switch to close said controllable switch if an incorrect main input voltage is detected, so as to close the switching path; and an energy supply device, which is connected in parallel to the switching path and is designed to convert a voltage drop across the closed controllable switch into a supply voltage and to apply the supply voltage to the sensor device. This achieves the advantageous object of creating an efficient protection from incorrect main input voltages. As the electrical protective circuit comprises the energy supply device and as said device provides said circuit with the supply voltage, there is no need for external energy sources to supply the electrical protective circuit with energy.

The input terminal can comprise a first pole and a second pole, to which the main input voltage can be applied in the form of a difference in electrical potential. Closing the switching path can result in short-circuiting the input terminal—that is, the first pole with the second pole—across the switching path. The electrical protective circuit can be connected to a voltage supply device and/or a current supply device via the input terminal, and it can close the switching path when detecting an incorrect main input voltage provided by the current supply device and/or the voltage supply device, so as to short-circuit the current and/or voltage supply device via the switching path.

The main input voltage can be a direct-current voltage. Specifically, the main input voltage can comprise voltages of up to 60 VDC, for example for applications in the automation or automotive sectors.

The electrical protective circuit can be a closed module, which, for example, comprises a housing, in which all components of the protective circuit are arranged. Additionally, the protective circuit can comprise electrical lines, which electrically connect the components of the protective circuit.

The sensor device furthermore can comprise an electrical circuit for detecting an incorrect main input voltage and for controlling a controllable switch. The sensor device can be electrically connected to the controllable switch via an electrical line. Furthermore, the sensor device can be electrically connected to the input terminal for detecting the incorrect main input voltage.

The energy supply can convert the voltage drop across the switching path into the supply voltage, in particular the voltage drop across the controllable switch and/or the input resistors of the switching path. The voltage drop across the switching path can be 50 mV, 100 mV, 150 mV, 200 mV or 250 mV.

According to one example, the energy supply device includes an energy storage device, specifically a capacitor and/or a coil, which can be charged by the supply voltage, wherein the energy storage device is coupled with a supply voltage input terminal of the sensor device. This offers the advantage that the energy supply device can provide the supply voltage efficiently and independent of fluctuations in the voltage drop.

Fluctuations in the voltage drop, for example during a hiccup mode operation of a voltage supply device, which generates the main input voltage, can thus be compensated for during the conversion of the voltage drop into the supply voltage.

In one advantageous example of the electrical protective circuit, the energy supply device is designed to transition to an inactive state when the controllable switch is opened or if a threshold value of the voltage drop across the controllable switch is reached, wherein the conversion of the voltage drop into the supply voltage is prevented while the energy supply device is in the inactive state. This offers the advantage that the energy supply device only generates the supply voltage when required, specifically when the incorrect main input voltage is present. This can reduce the energy consumption of the electrical protective circuit.

The energy supply device can transition to an inactive state when the conversion of the voltage drop across the controllable switch into the supply voltage is not required, for example, when the controllable switch is opened or when the conversion is not possible to be performed, for example, when the voltage drop is too small to generate the supply voltage. The energy supply device can have a high impedance in its inactive state.

In another advantageous example of the electrical protective circuit, the controllable switch comprises a transistor, specifically a normally-closed FET transistor. The FET transistor can be a MOSFET transistor.

In another advantageous example of the electrical protective circuit, the control signal comprises a control voltage, wherein the sensor device is designed to apply the control voltage to a gate terminal of the transistor when an incorrect main input voltage is detected. This offers the advantage that the switching path is closed efficiently when the control voltage is applied.

In another advantageous example of the electrical protective circuit, the supply voltage and the control voltage are identical. The sensor device in this case can be designed such that it sends the supply voltage to the controllable switch when it senses the incorrect main input voltage, so as to close the controllable switch.

In another advantageous example of the electrical protective circuit, the incorrect main input voltage is an overvoltage and/or a voltage with reverse polarity. This offers the advantage of creating an efficient protection from overvoltages and/or voltages with reverse polarity.

In another advantageous example of the electrical protective circuit, a diode is connected in parallel to the controllable switch within the switching path, wherein the diode is arranged such that it short-circuits the input terminal in case a main input voltage with reverse polarity is applied. This offers the advantage that the main input voltage can be efficiently limited in case the polarity is reversed. Furthermore, a current entering the input terminal can be drained via the diode in case the polarity of the main input voltage is reversed.

In another advantageous example of the electrical protective circuit, the energy supply device comprises a first converter, specifically a DC-DC converter, which is designed to convert the voltage drop across the closed controllable switch into the supply voltage. This offers the advantage of being able to generate the supply voltage efficiently and with lower energy consumption. Specifically, no external energy source is required to generate the supply voltage.

In another advantageous example of the electrical protective circuit, the energy supply device comprises a second converter, which is connected between the first converter and the supply voltage input terminal of the sensor device, and which is designed to hold constant the supply voltage generated by the first converter, specifically holding said voltage constant by increasing or reducing it. This offers the advantage that the supply voltage can be made available to the sensor device in an efficient manner. The use of two converters makes it possible to ensure that the supply voltage can be generated efficiently even if the voltage drop across the closed controllable switch is low or if said voltage drop is subject to fluctuations. The second converter can be a step-up converter and/or a step-down converter.

In another advantageous example of the electrical protective circuit, the energy supply device comprises a third converter, which is designed to convert the voltage drop across the closed controllable switch into the supply voltage in case the polarity of the main input voltage is reversed. This offers the advantage that the supply voltage can still be generated efficiently even if the polarity of the main input voltage and/or of the voltage drop across the controllable switch is reversed.

In another advantageous example of the electrical protective circuit, the second converter is connected between the third converter and the sensor device to receive the supply voltage generated by the third converter and to hold said voltage constant prior to feeding it to the sensor device, specifically to hold said voltage constant by increasing or reducing it.

In another advantageous example of the electrical protective circuit, the energy supply device comprises a rectifier, specifically a diode, wherein the rectifier is designed to prevent a reverse polarity of the supply voltage in the case of a reverse polarity of the main input voltage. This offers the advantage that the supply voltage can still be generated efficiently even if the polarity of the main input voltage and/or of the voltage drop across the controllable switch is reversed.

In another advantageous example of the electrical protective circuit, the sensor device is designed to reduce a signal strength of the control signal when the supply voltage drops below a certain other threshold value. This offers the advantage that a minimal voltage drop across the controllable switch can be compensated for in an efficient manner. The reduction of the control signal can lead to an increase of the equivalent resistance of the controllable switch, and consequently to an increase in the voltage drop across the controllable switch, as well as an increase in the converted supply voltage.

In another advantageous example of the electrical protective circuit, the sensor device is designed to increase a signal strength of the control signal when the supply voltage rises above a certain minimal threshold value.

In another advantageous example of the electrical protective circuit, the protective circuit comprises an output terminal for emitting the main input voltage. The output terminal can be arranged in parallel to the switching path. This offers the advantage that the protective circuit can be operated as an intermediate module, for example between a current or voltage source and a load. The protective circuit can protect the load from an incorrect main input voltage, specifically from overvoltages or reverse polarity. The protective circuit can be designed as a four-pole module.

According to a second aspect of the disclosure, the object is achieved by a voltage supply device, specifically a constant-voltage power supply, which comprises the electrical protective circuit according to the first aspect of the disclosure. This offers the advantage that a voltage supply device can be created, which is efficiently protected from emitting an incorrect voltage, specifically an overvoltage and/or a voltage with reverse polarity.

BRIEF DESCRIPTION OF THE DRAWINGS

Examples of the present disclosure are represented in the drawings and are explained in more detail in the following.

DETAILED DESCRIPTION

Figure 1:
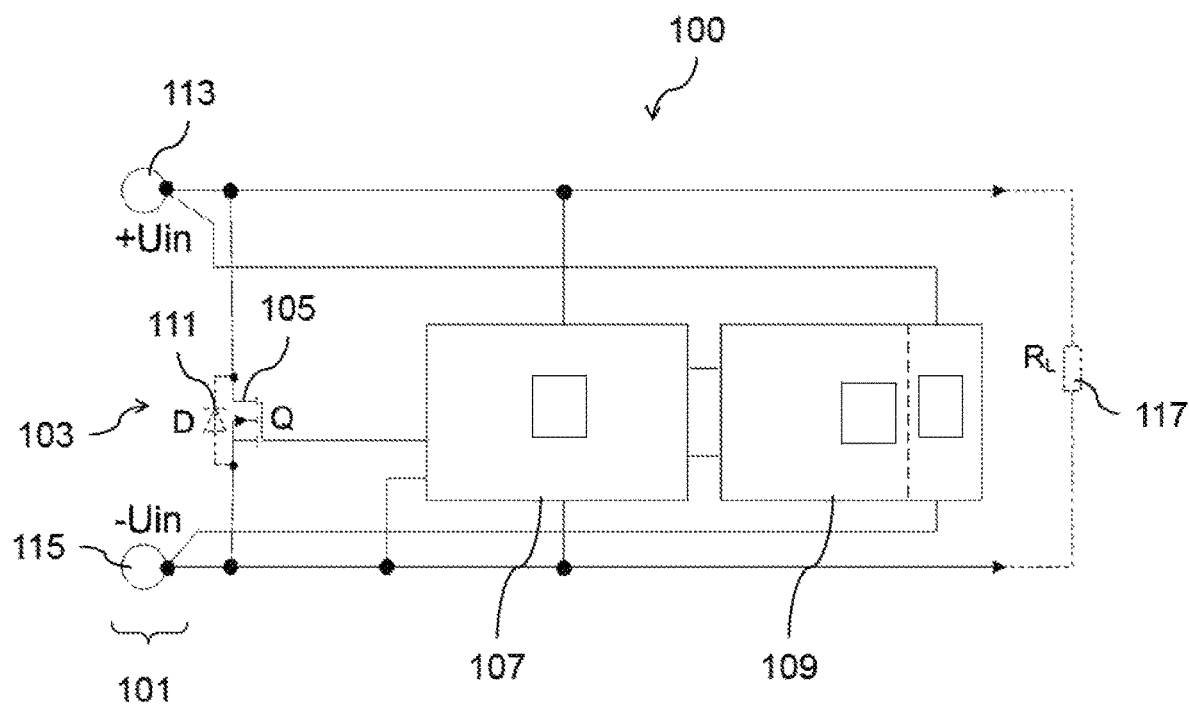
FIG. 1 shows a schematic diagram of an electrical protective circuit according to an example.

FIG. 1 shows a schematic diagram of an electrical protective circuit 100 according to one example.

The electrical protective circuit 100 comprises an input terminal 101, to which a main input voltage can be applied; a switching path 103, which is arranged in parallel to the input terminal 101, wherein a controllable switch 105 for closing the switching path 103 is connected in the switching path 103; and a sensor device 107, which is connected to the input terminal 101 and is designed to detect an incorrect main input voltage present at the input terminal 101, wherein the sensor device 107 is designed to transmit a control signal to the controllable switch 105 to close said controllable switch 105 if an incorrect main input voltage is detected, so as to close the switching path 103. Furthermore, the electrical protective circuit 100 comprises an energy supply device 109, which is connected in parallel to the switching path 103 and is designed to convert a voltage drop across the closed controllable switch 105 into a supply voltage and to apply the supply voltage to the sensor device 107.

The input terminal 101 can comprise a first pole 113 and a second pole 115, to which the main input voltage can be applied in the form of a difference in electrical potential. Closing the switching path 103 can result in short-circuiting the input terminal—that is, the first pole 113 with the second pole 115—via the switching path 103. The electrical protective circuit 100 can be connected to a voltage supply device and/or a current supply device via the input terminal 101, and it can close the switching path 103 when detecting an incorrect main input voltage provided by the current supply device and/or the voltage supply device, so as to short-circuit the current and/or voltage supply device via the switching path 103.

The voltage can be a direct-current voltage. Specifically, the voltage can comprise voltages of up to 60 VDC, for example for applications in the automation or automotive sectors.

A load 117, that is, an electrical load, can be connected to the electrical protective circuit 100. Specifically, the load 117 can be connected in parallel to the switching path 103. The electrical protective circuit 100 can be designed to feed the main input voltage to the load 117.

The electrical protective circuit 100 can be a closed module, which, for example, comprises a housing, in which all components of the protective circuit 100 are arranged. Additionally, the electrical protective circuit 100 can comprise electrical lines, which electrically connect the components of the electrical protective circuit 100.

The sensor device 107 furthermore can comprise an electrical circuit 209 for detecting an incorrect main input voltage and for controlling the controllable switch 105. The sensor device 107 can be electrically connected to the controllable switch 105 via an electrical line. Furthermore, the sensor device 107 can be electrically connected to the input terminal 101 for detecting the incorrect main input voltage.

The energy supply device 109 can convert the voltage drop across the switching path 103 into the supply voltage, in particular the voltage drop across the controllable switch 105 and/or the input resistors of the switching path 103. The voltage drop across the switching path 103 can be 50 mV, 100 mV, 150 mV, 200 mV or 250 mV.

The controllable switch 105 can comprise a transistor, specifically a FET transistor or MOSFET transistor. The control signal can be a control voltage, wherein the sensor device 107 is designed to apply the control voltage to a gate terminal of the transistor when an incorrect main input voltage is detected. The transistor furthermore can be designed as a normally-closed transistor, and it can close the switching path 103 only when the control voltage is applied to the gate terminal of said transistor.

The control voltage can correspond to the supply voltage, specifically, the control voltage and the supply voltage can be identical. The sensor device 107 can be designed to apply the supply voltage to the gate terminal of the transistor when an incorrect main input voltage is detected.

The incorrect main input voltage can comprise an overvoltage or a reverse polarity of the main input voltage. Thereby, the electrical protective circuit 100 can be used as protection against overvoltages or voltages with reverse polarity. If the electrical protective circuit 100, for example, is connected to a voltage supply device or a current supply device, the electrical protective circuit 100 can detect an overvoltage and/or reverse polarity of the voltage provided by the current or voltage supply device and can short-circuit the current or voltage supply device via the switching path 103 when it detects such an overvoltage and/or reverse polarity.

The electrical protective circuit 100 in FIG. 1 furthermore comprises a diode 111, which is connected in parallel to the controllable switch 105 within the switching path 103.

The diode 111 can be arranged in the opposite direction—that is, anti-parallel—to the regular flow of current within the switching path 103.

The diode 111 additionally can serve as protection against reverse polarity. When the polarity of the main input voltage is reversed, the diode 111 short-circuits the first pole 113 with the second pole 115 of the input terminal 101, for example. In the example in FIG. 1, the diode 111 can conduct a current from the first pole 113 to the second pole 115 when the polarity of the main input voltage is reversed. The diode 111 can thus limit the reverse polarity main input voltage coming from the energy supply to the value of the forward voltage of the diode 111, which could be between 0.7 V and 1 V, for example. The diode 111 can be a Zener diode.

Figure 2:
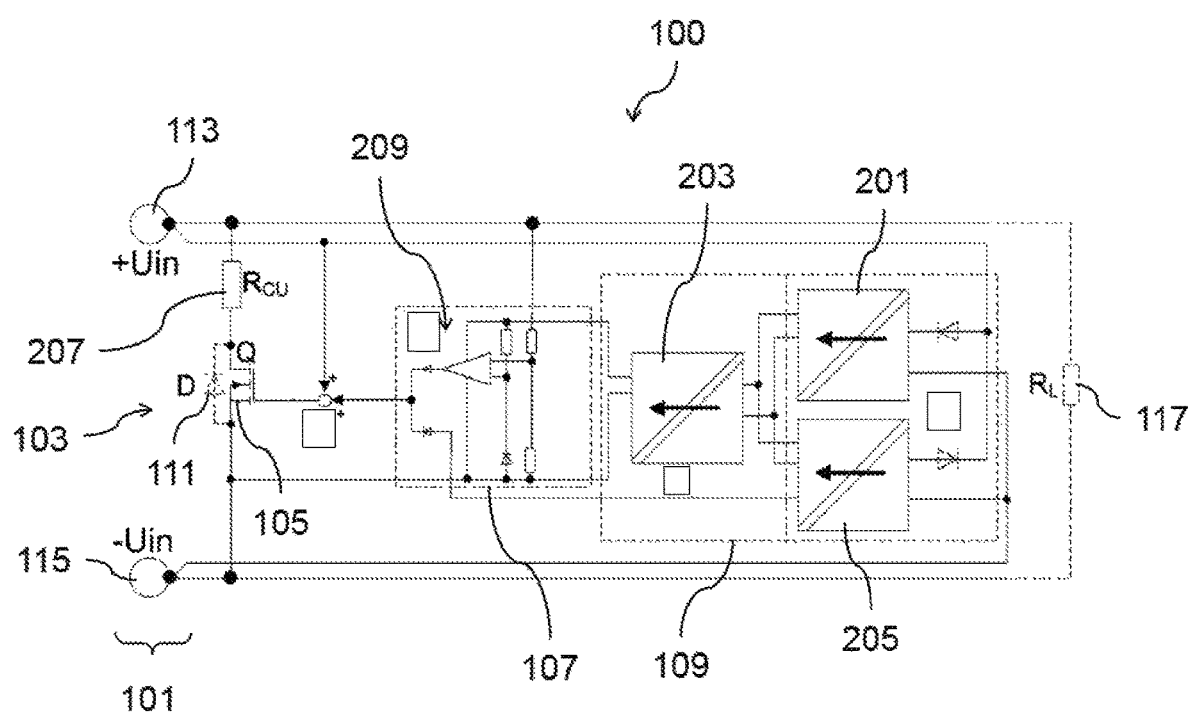
FIG. 2 shows a schematic diagram of an electrical protective circuit according to an example.

FIG. 2 shows a schematic diagram of the electrical protective circuit 100 according to another example.

The energy supply device in FIG. 2 comprises a first converter 201, a second converter 203 and a third converter 205. The first converter 201, the second converter 203 and the third converter 205 can be a DC-DC converters, which function as charge pumps and which convert the voltage drop across the switching path 103 into the supply voltage, wherein the supply voltage can be higher than the voltage drop.

The first converter 201 can be designed to generate the supply voltage when the main input voltage is applied with regular polarity, and the third converter 205 can be designed to generate the supply voltage when the main input voltage is applied with reverse polarity.

The second converter 203 can be connected between the first converter 201 and a supply voltage input terminal of the sensor device 107, or between the third converter 205 and the supply voltage input terminal of the sensor device 107. The second converter 203 can be designed to hold constant the supply voltage generated by the first converter 201 or, respectively, the third converter 205, specifically to hold said voltage constant by increasing or reducing it and to apply said voltage to the supply voltage input terminal of the sensor device 107. The use of the second converter 203 makes it possible to ensure that the required supply voltage can be generated efficiently even if the voltage drop across the closed controllable switch 105 is low. The second converter 203 can be a step-up converter and/or a step-down converter.

According to one example, the first converter 201 and/or the second converter 203 and/or the third converter 205 respectively comprise a normally-open transistor and/or a resonant circuit, specifically a normally-closed resonant circuit.

According to another example, the energy supply 109 comprises a rectifier, specifically a diode. The rectifier can be designed to prevent or compensate for a reverse polarity of the supply voltage in case the polarity of the main input voltage is reversed.

According to another example, the rectifier comprises diodes with low forward voltages. Furthermore, the rectifier can comprise normally-open switches. The rectifier can be a bridge rectifier.

According to another example, the energy supply 109 comprises an energy storage device, specifically a capacitor and/or a coil. The energy storage device can be charged by the supply voltage. Furthermore, the energy storage device can be coupled with the supply voltage input terminal of the sensor device 107.

The energy storage device can compensate for fluctuations in the voltage drop, for example during a hiccup mode operation of a voltage supply device, which generates the main input voltage, during the conversion of the voltage drop into the supply voltage. Furthermore, the supply voltage can be generated from the energy stored in the energy storage device following the detection of the incorrect main input voltage by the sensor device 107. After the controllable switch 105 is closed, the supply voltage can be generated or converted from the voltage drop across the closed controllable switch 105.

According to another example, the energy supply device 107 comprises a number of energy harvesting devices. Furthermore, the converters 201, 203, 205 can be designed as energy harvesting converters The switching path 103 in FIG. 2 comprises a resistor 207, which is connected between the controllable switch 105 and the first pole 113, and which represents the equivalent resistance of the switching path 103.

According to one example, the energy supply device 109 is designed to convert the voltage drop across the controllable switch 105 and/or the resistor 207 into the supply voltage.

The sensor device 107 in FIG. 2 comprises an electrical circuit 209 for detecting an incorrect main input voltage and for controlling the controllable switch 105. The electrical circuit 209 can comprise an OR-gate of two diodes for controlling the controllable switch 105, which in FIG. 2 is a normally-closed transistor.

According to one example, the sensor device 107 is designed to reduce a signal strength of the control signal when the supply voltage drops below a certain other threshold value. If an unknown current or voltage source is short-circuited via the switching path 103, for example, the impedance of the voltage drop across the controllable switch 105 and/or the equivalent resistance 207 of the switching path 103 can be too low to convert the voltage drop into a supply voltage of a level sufficient to generate the control signal. If the supply voltage is too low, the sensor device 107 can be designed to reduce the control signal, specifically the control voltage, which is applied to the gate terminal of the FET transistor. The reduction of the control voltage causes the impedance of the FET transistor to increase, whereby the voltage drop across the transistor is increased.

According to another example, the sensor device 107 is designed to increase the signal strength of the control signal when the supply voltage rises above a certain minimal threshold value.

According to another example, an unknown energy source emitting a low output current can permanently be short-circuited via the switching path 103 in case of overvoltage or reverse polarity, by adjusting the control signal, specifically the control voltage, to a sufficient voltage level.

According to another example, the electrical protective circuit 100 comprises a regulator, which is designed to decrease the control voltage when the supply voltage is too low and to increase the control voltage when the supply voltage is too high.

Figure 3:
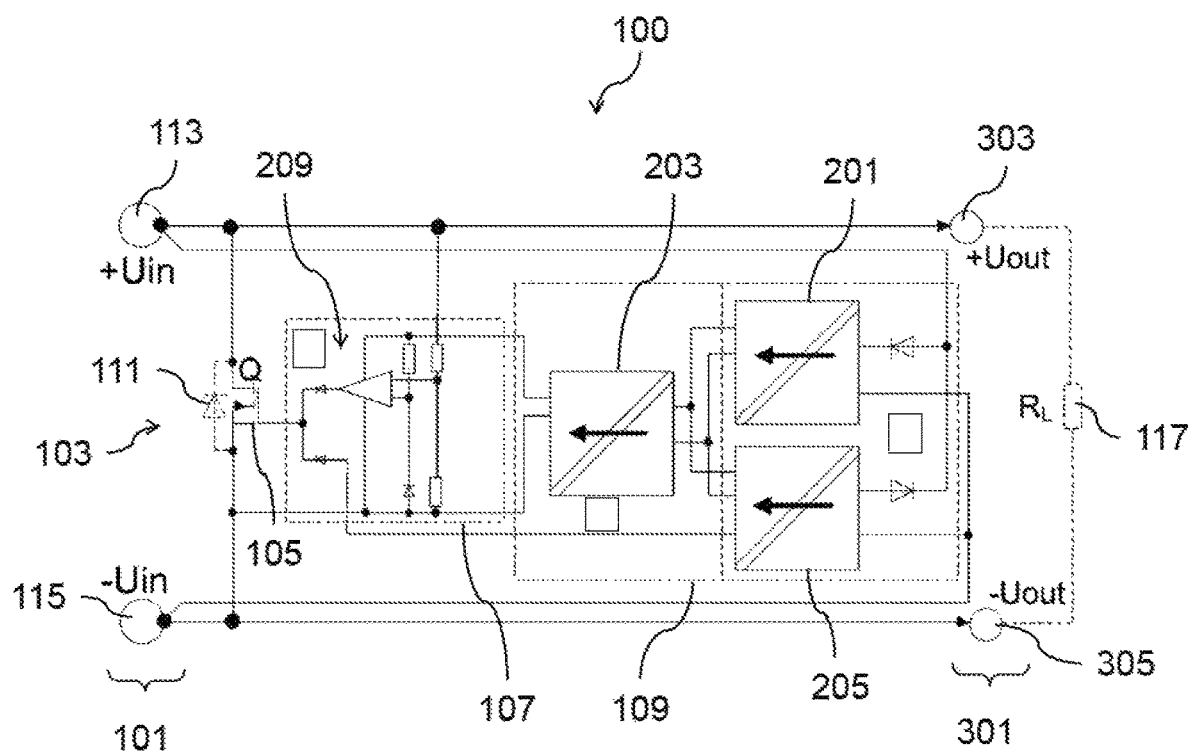
FIG. 3 shows a schematic diagram of an electrical protective circuit with an output terminal according to an example.

FIG. 3 shows a schematic diagram of the electrical protective circuit with an output terminal 301, according to one example.

The output terminal 301 can be designed to emit the main input voltage. The output terminal 301 can be arranged in parallel to the switching path 103. The output terminal 301 in FIG. 3, comprises a third pole 303 and a fourth pole 304, to which the main input voltage can be applied in the form of a difference in electrical potential.

According to one example, the protective circuit can be designed as a four-pole module. The tour-pole module can be connected between the current or voltage supply and the load 117, that is, an electrical load.

Figure 4:
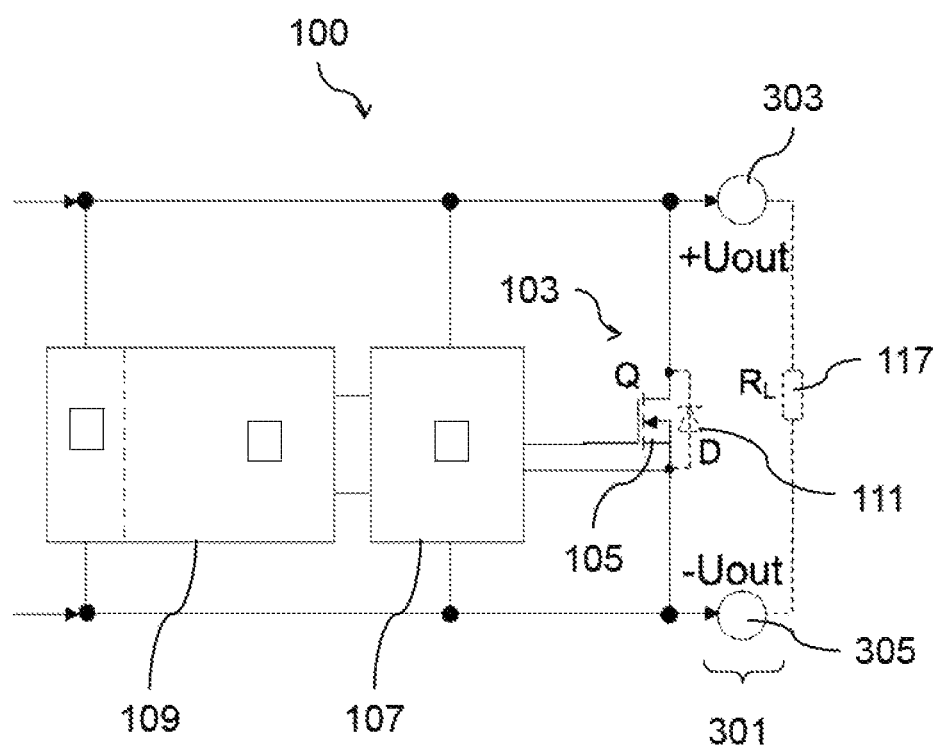
FIG. 4 shows a schematic diagram of an integrated electrical protective circuit according to an example.

FIG. 4 shows a schematic diagram of the electrical protective circuit 100, which is integrated into a voltage supply device or a current supply device, according to one example.

The voltage supply device can be a constant-voltage power supply and a current supply device can be a constant-current power supply.

According to one example, the electrical protective circuit 100 can be connected to an output terminal of the voltage supply device as a voltage monitor. The protective circuit can limit the supply voltage in case of failure of the voltage regulator of the voltage supply device or in case the main input voltage is applied in reverse, that is, with reverse polarity.

According to another example, the electrical protective circuit 100 can be operated as a low-loss overvoltage and/or reverse-polarity protection device without an external energy source.

LIST OF REFERENCE NUMBERS

100 Electrical protective circuit
101 Input terminal
103 Switching path
105 Controllable switch
107 Sensor device
109 Energy supply device
111 Diode
113 First pole
115 Second pole
117 Load
201 First converter
203 Second converter
205 Third converter
207 Resistor
209 Electrical circuit
301 Output terminal
303 Third pole
305 Fourth pole

What is claimed is:

1. An electrical protective circuit, comprising:
  an input terminal;
  a switching path in parallel with the input terminal, wherein a controllable switch is configured to close the switching path;
  a sensor device connected to the input terminal and configured to detect an incorrect voltage present at the input terminal, wherein the sensor device is further configured to transmit a control signal to the controllable switch to close the switching path when the incorrect voltage is detected; and
  an energy supply device connected in parallel with the switching path and configured to convert a voltage drop across the closed controllable switch into a supply voltage and to apply the supply voltage to the sensor device;
  wherein the energy supply device comprises a first converter configured to convert the voltage drop across the closed controllable switch into the supply voltage, and a second converter connected between the first converter and a supply voltage input terminal of the sensor device, the second converter configured to hold constant the supply voltage generated by the first converter.

2. The electrical protective circuit according to claim 1, wherein the energy supply device comprises an energy storage device configured to be charged by the supply voltage, wherein the energy storage device is coupled with a supply voltage input terminal of the sensor device.

3. The electrical protective circuit according to claim 2, wherein the energy storage device is a capacitor or a coil.

4. The electrical protective circuit according to claim 1, wherein the energy supply device is configured to transition to an inactive state when the controllable switch is opened or when a threshold value of the voltage drop across the controllable switch is reached, and wherein the conversion of the voltage drop into the supply voltage is prevented while the energy supply device is in the inactive state.

5. The electrical protective circuit according to claim 1, wherein the controllable switch comprises a transistor.

6. The electrical protective circuit according to claim 5, wherein the control signal comprises a control voltage and wherein the sensor device is configured to apply the control voltage to a gate terminal of the transistor when the incorrect voltage is detected.

7. The electrical protective circuit according to claim 6, wherein the supply voltage is identical to the control voltage.

8. The electrical protective circuit according to claim 5, wherein the transistor is a normally-closed FET transistor.

9. The electrical protective circuit according to claim 1, wherein the incorrect voltage is an overvoltage, a voltage with reverse polarity, or some combination thereof.

10. The electrical protective circuit according to claim 1, wherein a diode is connected in parallel with the controllable switch within the switching path, wherein the diode is arranged to short-circuit the input terminal when the incorrect voltage has reverse polarity.

11. The electrical protective circuit according to claim 1, wherein the energy supply device comprises a third converter configured to convert the voltage drop across the closed controllable switch into the supply voltage when a polarity of a main input voltage at the input terminal is reversed.

12. The electrical protective circuit according to claim 1, wherein the energy supply device comprises a rectifier configured to prevent a reverse polarity of the supply voltage when a reverse polarity of a main input voltage at the input terminal occurs.

13. The electrical protective circuit according to claim 12, wherein the rectifier comprises a diode.

14. The electrical protective circuit according to claim 1, wherein the sensor device is configured to reduce a signal strength of the control signal when the supply voltage drops below a certain other threshold value.

15. The electrical protective circuit according to claim 1, further comprising an output terminal configured to emit a main input voltage at the input terminal.

16. The electrical protective circuit according to claim 1, wherein the electrical protective circuit is a component of a constant-voltage power supply.

17. The electrical protective circuit according to claim 1, wherein the first converter is a DC-DC converter.

18. The electrical protective circuit according to claim 1, wherein the second converter is configured to hold the supply voltage generated by the first converter constant by increasing or reducing the supply voltage.

* * * * *